United States Patent [19]

Lehr et al.

[11] Patent Number: 5,068,792

[45] Date of Patent: Nov. 26, 1991

[54] METHOD AND AN ARRANGEMENT FOR ADJUSTING A HEIGHT CONTROL SYSTEM OF A VEHICLE

[75] Inventors: Hans-Thomas Lehr, Weissach; Peter Schäfer, Mönsheim, both of Fed. Rep. of Germany

[73] Assignee: Dr. Ing.h.c.F. Porsche Aktiengesellschaft, Fed. Rep. of Germany

[21] Appl. No.: 535,530

[22] Filed: Jun. 11, 1990

[30] Foreign Application Priority Data

Jun. 10, 1989 [DE] Fed. Rep. of Germany ....... 3919040

[51] Int. Cl.5 .................. B60G 17/00; G01C 5/00
[52] U.S. Cl. ..................... 364/424.05; 364/424.03; 364/562; 280/707
[58] Field of Search ............. 364/424.01, 424.03, 364/424.05, 550, 551.01, 562, 425, 571.01, 571.02, 571.05, 571.08; 280/707, 6.12, DIG. 1, 840; 180/41; 340/443

[56] References Cited

U.S. PATENT DOCUMENTS

| | | | |
|---|---|---|---|
| 4,593,920 | 6/1986 | Natsume et al. | 280/707 |
| 4,659,104 | 4/1987 | Tanaka et al. | 280/707 |
| 4,700,303 | 10/1987 | Tokuyama et al. | 364/424.01 |
| 4,805,923 | 2/1989 | Soltis | 280/707 |
| 4,873,654 | 10/1989 | Alexander et al. | 364/551.01 |
| 4,887,840 | 12/1989 | Harara et al. | 280/707 |
| 4,926,352 | 5/1990 | Staffe | 364/550 |

FOREIGN PATENT DOCUMENTS

| | | |
|---|---|---|
| 0297736 | 1/1989 | European Pat. Off. |
| 0324417 | 7/1989 | European Pat. Off. |
| 3432430 | 3/1986 | Fed. Rep. of Germany |
| 3437799 | 4/1986 | Fed. Rep. of Germany |
| 3540599 | 5/1987 | Fed. Rep. of Germany |
| 3804457 | 9/1988 | Fed. Rep. of Germany |
| 3726344 | 2/1989 | Fed. Rep. of Germany |
| 89/09702 | 10/1989 | World Int. Prop. O. |

Primary Examiner—Parshotam S. Lall
Assistant Examiner—Michael Zanelli
Attorney, Agent, or Firm—Evenson, Wands, Edwards, Lenahan & McKeown

[57] ABSTRACT

A method and apparatus for adjusting a height control system of a vehicle, which has a control apparatus capable of carrying out diagnostic functions, and takes place by means of a diagnostic apparatus. In a diagnostic mode, the diagnostic apparatus selects a "height adjusting" function in which the height of the vehicle is adjusted by means of manual measurement and incremental control of an adjusting device for increasing or decreasing the height. When the height is correct, the actual height value is inputted as the future desired height value, and the diagnostic analysis is stopped.

7 Claims, 4 Drawing Sheets

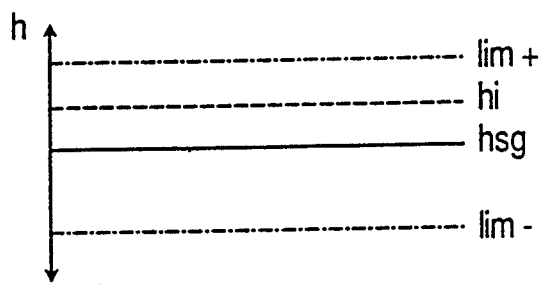
FIG. 6
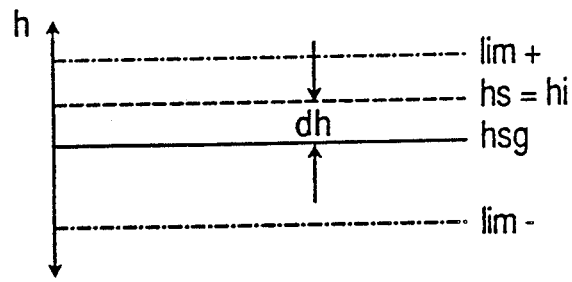
FIG. 7
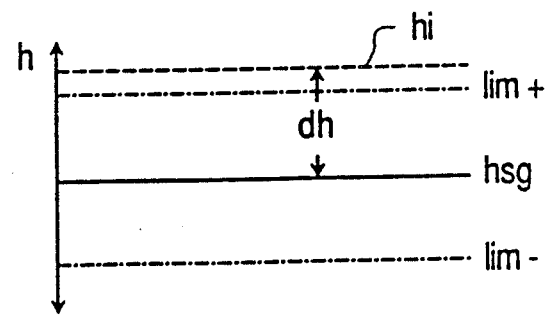
FIG. 8
FIG. 9

METHOD AND AN ARRANGEMENT FOR ADJUSTING A HEIGHT CONTROL SYSTEM OF A VEHICLE

BACKGROUND AND SUMMARY OF THE INVENTION

This invention relates to a method and apparatus for calibrating a height control system of a vehicle. Such height control systems generally comprise an adjusting device for the height h of the body of the vehicle with respect to the chassis or a road surface, as well as a control device for the adjusting device which is in turn controlled by a control apparatus, and a relative-height sensor which detects the height of the vehicle body relative to a predetermined reference point. The adjusting device may, for example, be a hydraulic or pneumatic cylinder arranged in a spring strut which supports the chassis with respect to the body. The control device, in addition to a pressure supply circuit having a pump, a sump and a pressure accumulator, also has control elements (solenoid valves) by means of which the pressure in the hydraulic cylinders of individual wheels or axles may be increased (to lift the vehicle) or may be reduced (to lower the vehicle). This type of a height control system is known, and is illustrated for example, by U.S. Pat. No. 4,593,920. Comparable systems are also shown in the German patent document DE-C2 34 37 799, and in U.S. Pat. Nos. 4,659,104, and 4,700,303.

However, tolerances that occur in the production and the assembly of the vehicle can result in an erroneous actual height signal (hi) emitted by the relative-height sensor, and may thus result in an inaccurate height control.

It is therefore an object of the present invention to provide a method and apparatus for the calibration of a height control system of a vehicle which permits compensation for these tolerances by simple means.

This and other objects are achieved by providing an interface between the vehicle height control system and a diagnostic device which initiates a series of calibration steps in which the control system is commanded to bring the vehicle to a predetermined height, the actual height of the vehicle is then measured by external means and compared with the predetermined height, and the control system is adjusted to compensate for any deviation between the actual vehicle height and the predetermined height.

Principal advantages of the present invention are that it provides a simple means to compensate for tolerances caused by the production and the assembly process, particularly at the vehicle body, the connection of the wheel suspension to the body, the chassis itself and at the relative-height sensor, without any extensive and expensive mechanical balancing operations that might, for example, be carried out at the sensor itself, its connection to the vehicle body or at a balancing device (control potentiometer) at the control apparatus.

The control apparatus is capable of carrying out diagnostic operations of the height control system in a manner that is known per se. (See, for example, German patent documents DE-A1 37 26 344, DE-A1 35 40 599 and DE-A1 34 32 430.) The calibration process is carried out a diagnostic mode into which the control apparatus is brought by means of the connection of a diagnostic apparatus, such as Bosch Model KTS 301, or a correspondingly configured personal computer.

The "height adjustment" mode is initiated by the diagnostic apparatus and the height of the body of the vehicle is measured relative to a scale, or by other means of a normal measurement. By way of input devices at the diagnostic apparatus, the control devices are controlled in increments until the height (h) corresponds to the preset height (hsns) (normal position). Thereafter, in a set mode initiated by the diagnostic apparatus, the actual values (hi) of the relative-height sensors are substituted as the desired values (hsn) for the normal position, and the adjusting (and the diagnostic analysis) are stopped.

Other objects, advantages and novel features of the present intention will become apparent from the following detailed description of the invention when considered in conjunction with the following drawings:

BRIEF DESCRIPTION OF THE DRAWINGS

FIG. 6 is a videoscreen output for an incorrectly implemented adjustment, FIG. 7 is a height/desired value-height diagram, FIG. 8 is a diagram according to FIG. 7 with a value of the height for a normal position which is within specific limits, FIG. 9 is a diagram according to FIG. 7, however with a value which is outside the limits.

DETAILED DESCRIPTION OF THE DRAWINGS

Figure 1:
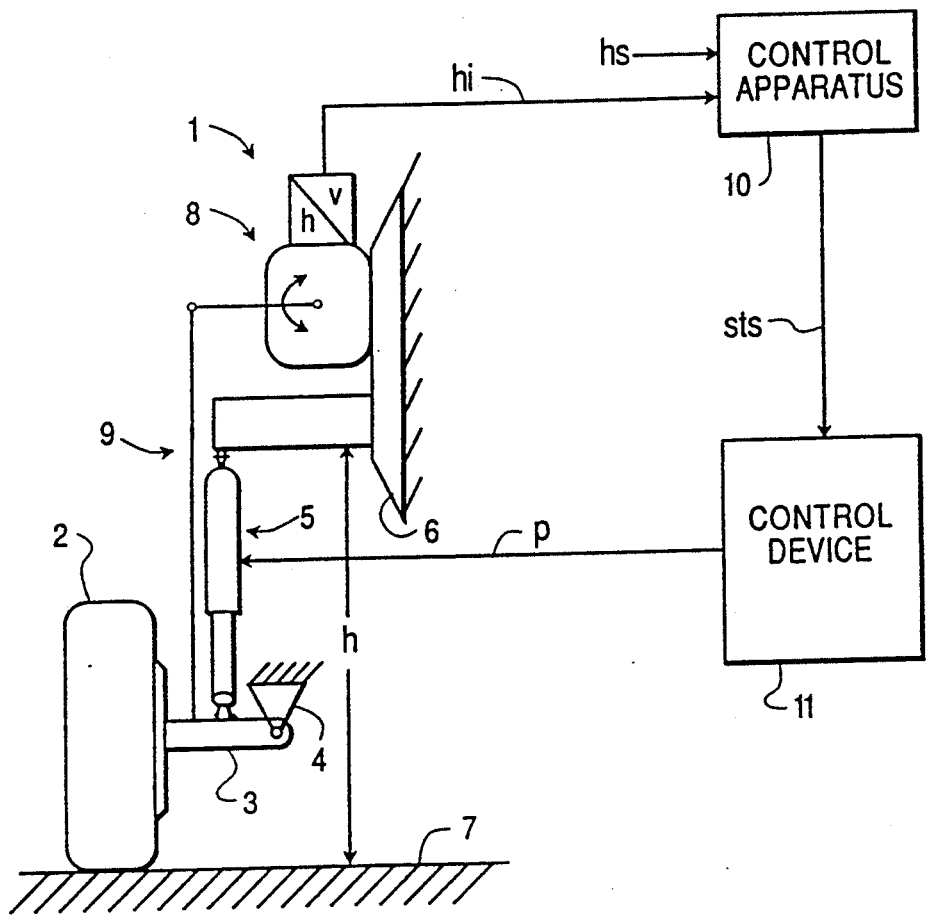
FIG. 1 is a view of a prior art height control system for a vehicle.

FIG. 1 depicts a height control system of a vehicle, which is designated generally by reference number 1. A wheel 2 is connected with a vehicle chassis connection 4 by way of a wheel carrier 3. By means of an adjusting device 5 (spring strut with hydraulic or pneumatic cylinders), the wheel carrier 3 supports a vehicle body connection 6. By means of the adjusting device 5, the height (h) of the vehicle body can be adjusted with respect to the chassis or a road 7.

A relative-height sensor 8 is fastened to the motor vehicle body connection 6. By way of a lever linkage 9, height sensor 8 detects the height (h) of the vehicle body with respect to the road surface 7 (indirectly by way of the wheel 2), and converts it to an (electric) actual height signal (hi) which is fed to a control apparatus 10. The control apparatus 10 compares the actual height signal (hi) with a preset or presettable desired height signal (hs), and generates control signals (sts), on the basis of which a control device 11 increases or decreases, for example, a pressure (p) for the adjusting device 5, whereby the height (h) is increased or reduced correspondingly.

The height control depicted in FIG. 1 is known, and is illustrated and described by U.S. Pat. Nos. 4,593,920; 4,659,104; and 4,700,303 and German patent document DE-C2 34 37, mentioned above. It is therefore not discussed in detail. It may, for example, be a pneumatic, hydraulic and/or electric height control system. Also conceivable are other auxiliary energies for the adjusting of the height, such as electric or electromechanical ones.

Figure 2:
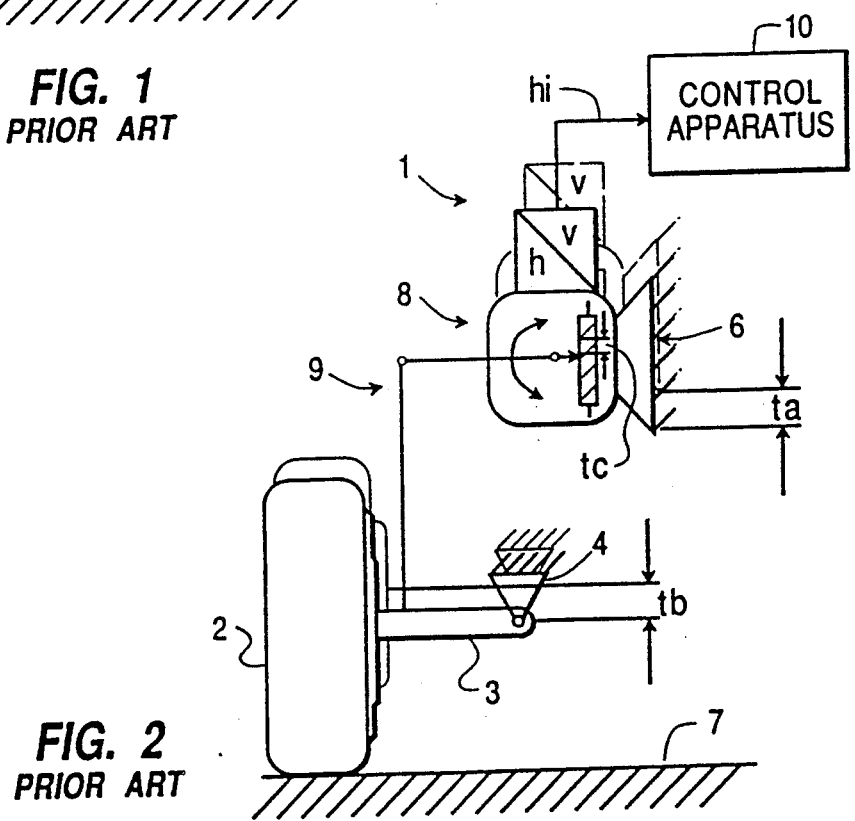
FIG. 2 is a representation of tolerances at a height control system according to FIG. 1.

FIG. 2 shows possible tolerances which can affect the accuracy of the prior art height control system of FIG. 1. In particular, tolerances are shown in the connection of the relative-height sensor 8 at the vehicle body connection-6 or at the vehicle body (tolerance ta) in the chassis connection 4 (tolerance tb) and electric or mechanical tolerances inside the relative-height sensor 8 (tolerance tc). These tolerances ta, tb and tc add up to an overall tolerance total, which may, under certain circumstances, result in considerable error in the actual height signal (hi).

Adjustment of the relative-height sensor 8 is therefore required. However, because this relative-height sensor 8 is often arranged at the body at a inaccessible point or at a point where the access is difficult, the adjustment is advantageously accomplished by mean of the method according to the present invention.

Figures 3, 4:
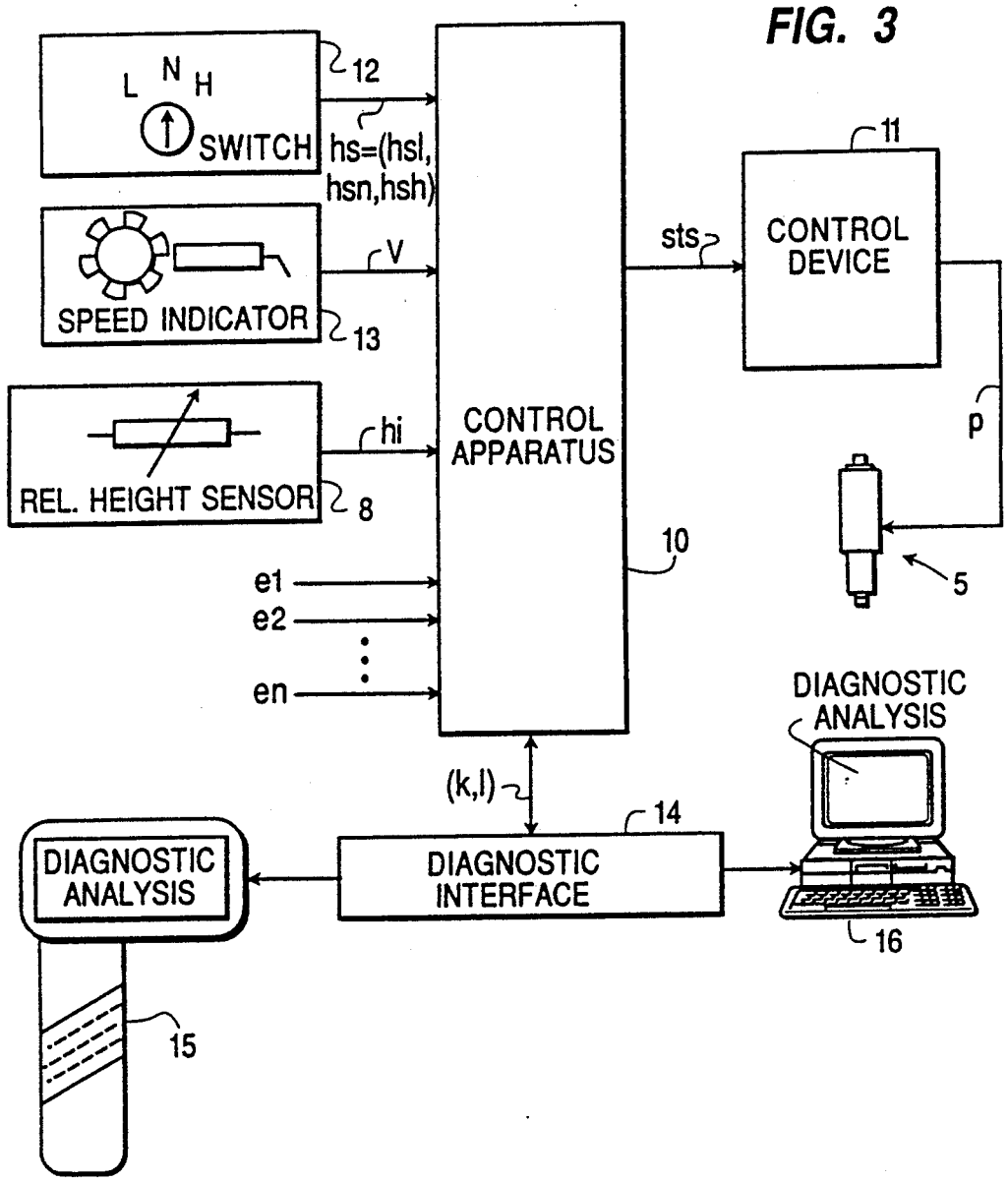
FIG. 3 is a block diagram of a configuration for carrying out an adjustment of a height control system according to FIG. 1.
FIG. 4 is a videoscreen input menu for a diagnostic apparatus for carrying out the adjustment.

FIG. 3 shows the control apparatus 10 with the most important input and output components and the configuration for carrying out the adjustment according to the present invention. In general, the input components comprise a switch 12 for presetting the desired height signal (hs) (low height (L), normal height (N) and high height (H), corresponding to the desired height signals (hsl), (hsn), and (hsh)), a relative-height sensor 8 and, for example, a speed indicator 13 which may provide a speed signal (v) to the control apparatus 10. In addition, other input values (e1, e2, . . . , en) may influence the control apparatus 10 which, however, will not be discussed in detail. As a result of these signals, the control apparatus 10 controls the control device 11, which in turn controls the adjusting device 5 in a known manner.

The control apparatus 10 is capable of performing diagnostic functions, and is adapted for connection via a diagnostic bus (k, 1) and diagnostic interface 14, with a diagnostic apparatus 15 (such as Model KTS 301) of Bosch Co., or a correspondingly configured personal computer 16. Diagnostic apparatus 15 and 16 are adapted to initiate the performance of diagnostic and control functions by control apparatus 10, including a "height adjustment" function, an "incremental controlling of the adjusting device" function and a setting function (SET), in response to signals transmitted by diagnostic apparatus 15 or 16 to control apparatus 10 via diagnostic interface 14 and diagnostic bus (k, 1), in a manner which will be explained below.

As shown in FIG. 4, input to diagnostic apparatus 15, 16 may be in the form of a videoscreen input menu 17, in which case the individual input commands (diagnostic analysis 18, adjust height 19, raise front axle 20 and lower front axle 21, raise rear axle 22 and lower rear axle 23, start SET, as well as activate menu selection (yes) 25 and continue to next menu selection (no) 26) represented by text or symbols, are selected by means of a cursor control in a known manner, and are triggered by means of an input key in such a manner that they operate like manually operated input devices.

In a height adjustment according to the invention, the following steps are carried out:

The vehicle must first be brought to a defined condition and to a measuring level. For example, the tire pressure must be adjusted to a standard value, and the vehicle must have a specific load condition (e.g., empty weight). After the diagnostic apparatus 15, 16 is connected to the diagnostic interface 14, the control apparatus 10, in a first step, is put into a diagnostic mode, and the "height adjustment" function is selected by means of the diagnostic apparatus 15, 16.

In a second step, the control apparatus 10 controls the adjusting device 5 in such a manner that the actual height signal (hi) is moved to a predetermined basic value (hsg) of the desired height signal.

In a third step, the control apparatus 10 switches from height control (hi=fr (hs, hi) to height regulating (hi=fs)).

In a fourth step, the height (h) of the vehicle, or of fixed points of the vehicle point, with respect to a fixed measuring plane, such as the road surface, is measured manually (for example, by means of a standard measurement or a scale); and in a fifth step, diagnostic apparatus 15, 16 is controlled manually (for example, by means of menu items raise axle 20, 22 or lower axle 21, 23 of menu 17 according to FIG. 4), to cause control device 10, via adjusting device 5, to increase or decrease the vehicle height (h) until it has reached a defined value (hsns) (as determined by manual measurement in accordance with step 4) which corresponds to the normal position.

In a sixth step, setting function (SET) 24 of the control apparatus 10 is selected by the diagnostic apparatus 15, 16, and the actual value of (hi), as determined by relative height sensors, is read into control apparatus 10 and is substituted as the desired height value (hsn)=(hs)=(hi) (normal position).

In a seventh step, the control apparatus 10 is switched from height regulating hi=fs to height control hi=fr (hs, hi). The height adjusting function is then terminated, and the diagnostic analysis is stopped.

At this point, by calling up the setting function (SET) 24, it is also possible to check the actual value of (hi) to determine the magnitude of its deviation (dh=hsg-hi) from the predetermined basic value (hsg), compared with a limit value (lim). The actual value (hi) is accepted as the desired value (hs) only if the amount of the deviation (dh) does not exceed the limit value (lim). If this is so, an error storage takes place in an error memory of the control apparatus 10, and the adjustment can alternatively be repeated or be stopped while keeping (hs)=(hsg) of the basic value (hsg) as the desired value (hs) (emergency program).

Figure 5:
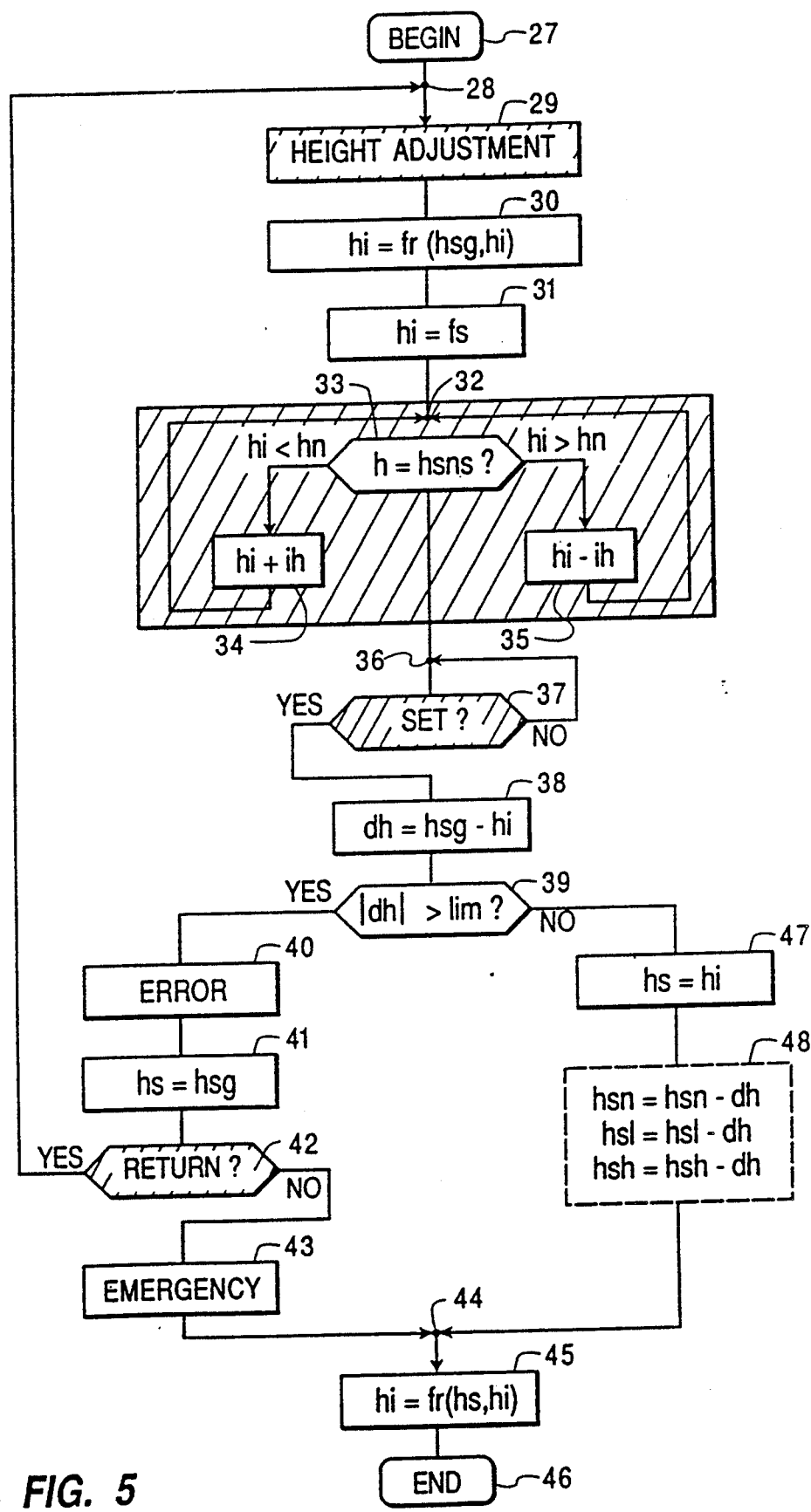
FIG. 5 is a flow chart for the adjustment.

The process according to the present invention is illustrated in FIG. 5 by means of a flow chart. Those operations which are to be carried out by the operator are included in the flow chart, and are hatched.

After the program start 27 (first step) and after passing the branching point 28, there is a waiting period until the operator has triggered the height adjustment function 29. The control apparatus 10 then brings the actual height value close to the basic value (hsg) of the desired height value (second step) 30, and the control apparatus 10 is switched from control to regulating hi-fs, 31 (third step).

After program point 32, steps 4 and 5 are carried out manually by the operator, specifically the measurement of the height (h) the comparison of the height (h) with the normal position (hsns), 33; the incremental increase of the height 34; or the incremental reduction of the height 35; and the return to the branching point 32, until the comparison is correct. After passing mark 36, the diagnostic apparatus waits until the setting function (SET) 37 is selected (wait loop).

Subsequently, the deviation (dh) of the actual value (hi) from the basic value (hsg) of the desired height value is determined 28, and is compared with the limit value (lim), 39. If it exceeds the limit value, the error storage 40 takes place; the desired height value (hs) is set to the basic (hsg) 41; and the operator is queried 42 as to whether the height adjustment is to be repeated or stopped (return). For this purpose, for example, the menu bar in menu 17 jumps to "adjust height," 19.

If the operator now enters "yes," the program returns to branching point 28; if "no" is entered, a so-called emergency program 43 is indicated, the videoscreen representation of which is shown in FIG. 6. This means that, corresponding to program step 41, the desired value (hs) is set back to the basic value (hsg), and this value is taken over as the desired height value (hs) (hsn for the normal position). Other height data supplied by the switch 12 will then have no effect. After a branching point 44, a return takes place to height control hi=fr (hs, hi) 45, and the program is terminated, 46.

If query 39 is negative, in the case of a (firmly) set desired height signal (hs), the then current actual height value signal (hi) is taken over as the desired height signal (hs), 47 or, in the case of the settable desired height signal (hs=hsl; hs=hsh; hs=hsh), the low desired height signal (hsl), the normal desired height signal (hsn), and the high desired height signal (hsh) are reduced by the deviation (dh), 48, or the deviation (dh) is set as the correcting value for the desired signals, and the operation is continued with program step 44.

In FIGS. 7 to 9 that follow, specific examples are shown of the position of the actual value (hi) relative to the basic value of the desired height signal (hsg). In FIG. 8, the deviation (dh) of the actual height signal (hi) from the basic value (hsg) of the desired height signal (hs) is within the limits lim+ and lim−, resulting in a correct height adjustment.

In contrast, in FIG. 9, the deviation (dh) is outside the limits, which leads to the above-described repetition of the height adjustment, or to the activating of the emergency program with the adjusting of the actual height signal (hi) to the basic value (hsg) of the desired height signal (hs). As a result in the event of a defective component (for example, a defective relative height sensor), neither the adjustment nor a prohibited manipulation at the system can be carried out (such as "placing the vehicle lower").

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A method for adjusting a height control system for a vehicle having a chassis and a body, which height control system comprises at least one height adjusting means for raising or lowering said body relative to a first reference point, height sensing means for measuring the height of said body relative to a second reference point, control means for causing said height adjusting means to raise or lower said body; said control means including means for presetting a desired height for said body, for detecting differences between said desired height and the height measured by said height sensing means and for causing said height adjusting means to raise or lower said body in response thereto, said control means being adapted for connection to a diagnostic means, said method comprising the steps of:

First, placing said vehicle in a predetermined measuring condition with respect to at least one of the following: tire pressure and load;

Second, causing said control means to enter a diagnostic mode in response to a signal from said diagnostic apparatus;

Third, causing said control means to control said height adjusting means to raise or lower said body to a position in which the height of said body as measured by said height sensing means corresponds to a predetermined basic desired value;

Fourth, causing said control means to enter a height regulating mode;

Fifth, manually measuring the height of said body relative to a reference point;

Sixth, causing said control means to raise or lower, said body until the height thereof, as measured manually, corresponds to said predetermined basic desired value;

Seventh, said diagnostic means causing said control means to enter a set mode in which the then current height of said body, as measured by said height measuring means is substituted in said control means as the desired value; and Eighth, causing said control means to enter a height control mode and terminating said adjusting process.

2. The method according to claim 1, wherein in the seventh step a deviation of the manually measured height from the predetermined basic desired value is set as a correcting value for the desired height signal.

3. The method according to claim 2 wherein in the seventh step, the then current height measured by said height measuring means is substituted as the desired value only if said deviation of the manually measured height from the predetermined basic desired value does not exceed a predetermined limit.

4. The method according claim 3 wherein in said seventh step, when said deviation exceeds said limit, an error signal is stored in said control means and the second through eighth steps can be repeated, or the process can be stopped with the predetermined basic value maintained as the desired value.

5. A height control system for a vehicle having a chassis and a body comprising: at least one height adjusting means for raising or lowering said body relative to a first reference point, height sensing means for measuring the height of said body relative to a second reference point, control means for causing said height adjusting means to raise or lower said body; said control means including means for presetting a desired height for said body, for detecting differences between said desired height and the height measured by said height sensing means and for causing said control means to raise or lower said body in response thereto, diagnostic interface means for communicating error signals from said height control system, diagnostic means for adjusting said height control system in response to signals communicated from said height control system and in response to manually inputted commands, said diagnostic means being operatively connected to said diagnostic interface means and having input means for receiving manually inputted commands, and further having means responsive to said manually inputted commands for causing said control means to initiate a level-adjusting function, an incremental-controlling-of-the-adjusting-means function and a set function.

6. The apparatus according to claim 5 wherein said diagnostic means is a microcomputer.

7. The apparatus according to claim 6 wherein said input means comprises a videoscreen input menu and cursor control keys adapted to be operated in conjunction with an input key of said diagnostic means.

* * * * *